(12) United States Patent
Rankin

(10) Patent No.: US 7,861,665 B2
(45) Date of Patent: Jan. 4, 2011

(54) PIPELINE PIG SIGNAL WITH ADJUSTABLE MOUNTING

(75) Inventor: William Jack Rankin, Sapulpa, OK (US)

(73) Assignee: TDW Delaware Inc., Wilmington, DE (US)

( * ) Notice: Subject to any disclaimer, the term of this patent is extended or adjusted under 35 U.S.C. 154(b) by 89 days.

(21) Appl. No.: 12/115,611

(22) Filed: May 6, 2008

(65) Prior Publication Data

US 2008/0276859 A1    Nov. 13, 2008

Related U.S. Application Data

(60) Provisional application No. 60/917,554, filed on May 11, 2007.

(51) Int. Cl.
*F16L 55/48* (2006.01)
(52) U.S. Cl. ....................... 116/303; 73/865.8
(58) Field of Classification Search ............... 116/204, 116/284, 285, 303; 73/865.8
See application file for complete search history.

(56) References Cited

U.S. PATENT DOCUMENTS

| | | | |
|---|---|---|---|
| 3,478,717 A * | 11/1969 | Kidd ........................... 116/204 |
| 4,079,619 A | 3/1978 | Dobesh |
| 4,491,018 A | 1/1985 | Stringer et al. |
| 4,596,204 A | 6/1986 | Ralls |
| 4,646,567 A * | 3/1987 | Ahmer .................... 73/170.03 |
| 4,658,646 A | 4/1987 | Bell et al. |
| 5,263,220 A | 11/1993 | Campbell |
| 5,279,251 A | 1/1994 | Bierman |
| 5,417,112 A | 5/1995 | Rosenberg |
| 5,450,765 A | 9/1995 | Stover |
| 5,564,470 A * | 10/1996 | Denmark et al. ............ 137/554 |
| 6,357,384 B1 | 3/2002 | Laymon et al. |
| 6,823,751 B1 * | 11/2004 | Young ....................... 73/865.8 |
| 2010/0263460 A1 * | 10/2010 | Laymon et al. ............ 73/865.8 |

FOREIGN PATENT DOCUMENTS

| | | | |
|---|---|---|---|
| EP | 254503 A2 * | 1/1988 |
| GB | 1407815 A * | 9/1975 |
| GB | 2035503 A * | 6/1980 |
| GB | 2200775 A * | 8/1988 |
| GB | 2280485 A * | 2/1995 |

OTHER PUBLICATIONS

International Search Report and Written Opinion; dated Aug. 22, 2008; issued by International Searching Authority ISA/US; 10 pages.
International Preliminary Report on Patentability issued by the International Bureau of WIPO on Nov. 26, 2009 in corresponding application PCT/US08/62811; 7 pgs.

* cited by examiner

*Primary Examiner*—R. A. Smith
(74) *Attorney, Agent, or Firm*—Gable Gotwals

(57) ABSTRACT

An improved signal with adjustable mounting to allow the signal to be oriented to face any direction, without rotating the pressure-containing plug, and with integral seal to protect the outer threads of the mounting nipple.

8 Claims, 6 Drawing Sheets

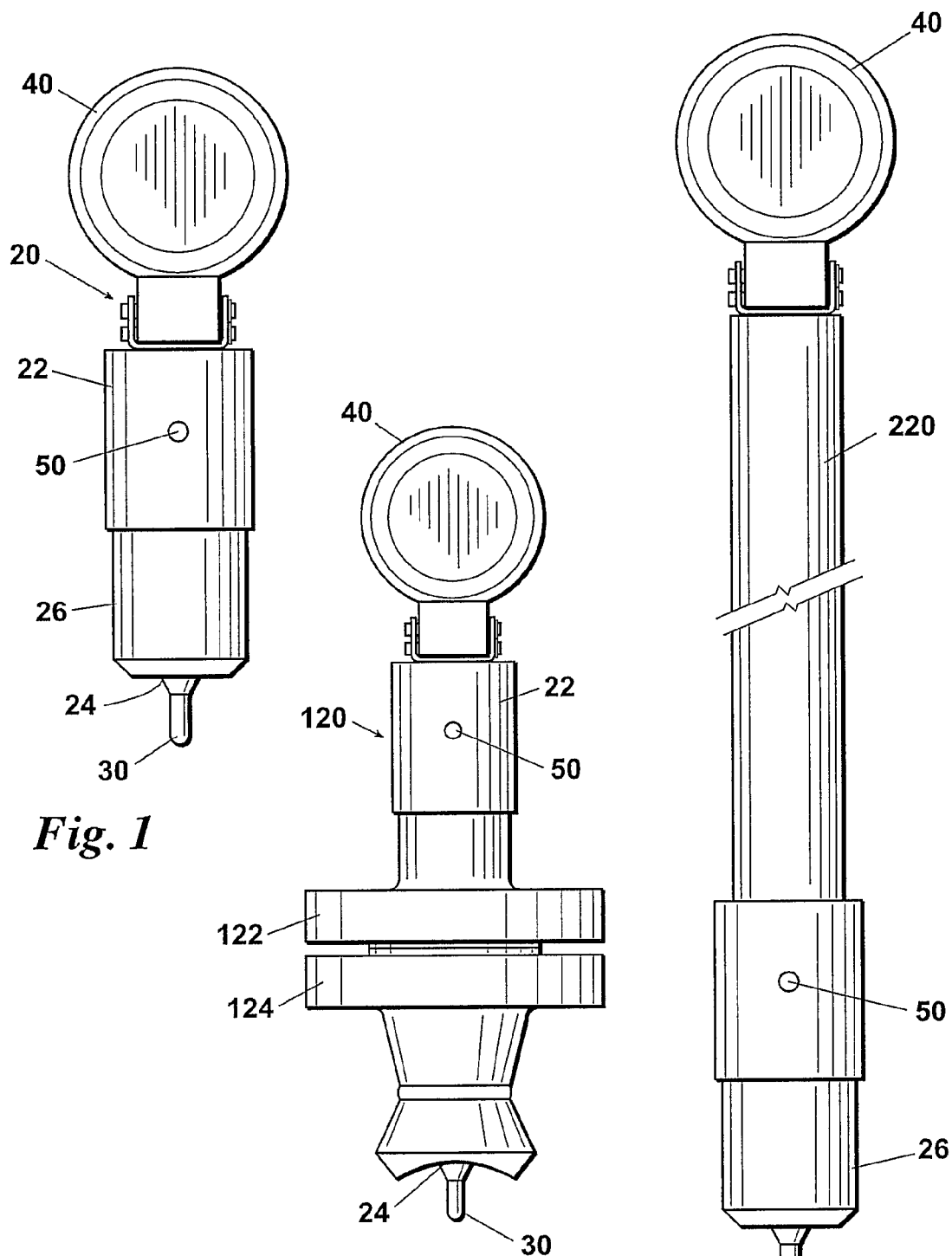

PIPELINE PIG SIGNAL WITH ADJUSTABLE MOUNTING

REFERENCE TO PENDING APPLICATIONS

This application is a continuation-in-part based on U.S. Provisional Application No. 60/917,554 filed May 11, 2007.

BACKGROUND OF THE INVENTION

Much of the liquid and gas utilized in the world, and particularly hydrocarbon liquids and gases, are transmitted from areas of production to areas of consumption through pipelines. To keep the interior of the pipelines clean, to separate different components, and to perform surveying functions, devices known as pipeline pigs are frequently used. Since the pipeline pigs may move at various speeds in the pipeline depending upon the velocity of fluid flow and other factors, it is sometimes difficult for the operator of a pipeline to know the location of a pipeline pig or to know when a pipeline pig has passed a certain point in a pipeline.

Various pig signals are known in the industry and are commonly available in the marketplace. These signals typically have a tubular body member or nipple which is mounted on the pipeline by welding or other means. The tubular body has a small diameter opening into the pipeline such that it is in fluid communication with the interior of the pipeline. A stem assembly is typically sealably placed inside the tubular body member thus sealing off the interior of the tubular body member and interior of the pipeline from the atmosphere. The stem has a shaft or trigger which extends into the interior of the pipeline. When the pipeline pig passes by the tubular body member it contacts the shaft. This contact then releases a spring loaded flag or other signal fixedly secured to the exterior of the tubular body member. This is accomplished through various mechanical and/or magnetic means.

Early pig signals used a mechanical linkage to release a spring loaded flag. More recent developments in this field have taken advantage of magnetic linkages to release a spring loaded flag. However no matter what type of mechanism was used to link the interior movement of the shaft to the releasing mechanism of the flag, the prior art flag assembly was always secured to the stem assembly and/or tubular body member by means which kept it in predetermined, fixed orientation relative to the stem assembly and/or tubular body member.

Because the flag is much easier to see from the front rather than a side view it is often beneficial to rotate the flag such that the flag faces the direction of an observer. Given the prior art design of the flag assembly being fixedly attached to the tubular body or stem assembly, the rotating of the flag requires either the tightening or loosening of the threadably engaged stem assembly. This could lead to the stem being either over tightened or too loose, or adjusted under pressure which may be a safety concern.

The other option was to unbolt the flag assembly from its mounting and re-bolt it in a different orientation. The drawback to the prior art in this situation is that the flag assembly can only be reoriented to a very limited number of orientations, typically 90 degree increments. Many times the optional orientations do not provide optimized viewing of the flag.

The external threads on the nipple often suffer from weathering and corrosion. The prior art generally does not address this problem.

BRIEF SUMMARY OF THE INVENTION

The present invention is an improved pipeline pig signal. The improved signal has a nipple, plug assembly and indicator assembly. When in use the nipple is attached to a pipeline such that it is in fluid communication with the pipeline. The plug assembly is sized to be contained within the nipple. The plug assembly has a radial groove on its outer surface. The indicator assembly has a flag, release mechanism and a cylindrical shaped body. The cylindrical shaped body fits over the plug assembly and nipple. The indicator assembly is secured to the plug assembly and nipple by at least one set screw passing through the cylindrical body of the indicator assembly and securing to the radial groove of the plug assembly. An O-ring is disposed between the interior surface of the indicator assembly cylindrical body and the outer surface of the nipple. This prevents moisture and other debris from entering in between the indicator assembly and the nipple.

The present invention provides the benefit of allowing the orientation or direction of the flag to be altered without loosening or tightening the plug assembly.

The present invention also provides the benefit of allowing the flag to be oriented such that it can face any direction unlike the prior art which is limited to facing the flag in one of a few pre-designated directions, or requiring rotating the plug assembly under pressure, or over-under tightening the threaded flag assembly.

Further objects and features of the present invention will be apparent to those skilled in the art upon reference to the accompanying drawings and upon reading the following description of the preferred embodiments.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 1 is a front view of one embodiment of the present invention.

FIG. 2 is a front view of another embodiment of the present invention.

FIG. 3 is a front view of another embodiment of the present invention.

DETAILED DESCRIPTION OF THE PREFERRED EMBODIMENTS

For explaining the present invention in detail it is to be understood that the invention is not limited in its application to the details of the construction and arrangement of the parts illustrated in the accompanying drawings. The invention is capable of other embodiments and of being practiced or carried out in a variety of ways. It is to be understood that the phraseology and terminology employed herein are for the purpose of description and not of limitation.

Elements shown by the drawings are identified by the following numbers:

| | |
|---|---|
| 20 | Improved pipeline pig signal |
| 22 | Indicator assembly |
| 24 | Plug assembly |
| 26 | Nipple |
| 28 | Interior (nipple) |
| 30 | Trigger |
| 32 | Magnet |
| 33 | O-ring |
| 34 | Threads |
| 36 | Threads |
| 38 | Groove |
| 40 | Flag |
| 42 | Release mechanism |
| 44 | Body (indicator assembly) |
| 46 | Interior (body - indicator assembly) |
| 48 | Second O-ring |
| 50 | Set screws |
| 52 | Pin |
| 54 | Release |
| 56 | Second magnet |
| 58 | Shaft ($2^{nd}$ magnet) |
| 60 | Torsion spring |
| 120 | Pipeline pig signal (flange mounted) |
| 122 | Flange |
| 124 | Second flange |
| 220 | Pipeline pig signal (with extension) |
| 320 | Pipeline pig signal (integral valve) |
| 322 | Integral valve |
| 324 | Flange |

Figure 4:
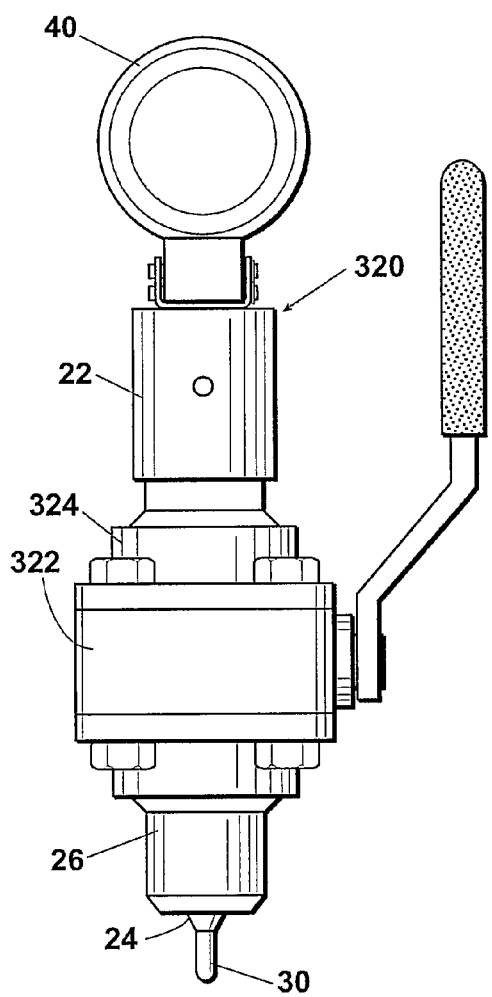
FIG. 4 is a front view of yet another embodiment of the present invention.
Figure 8:
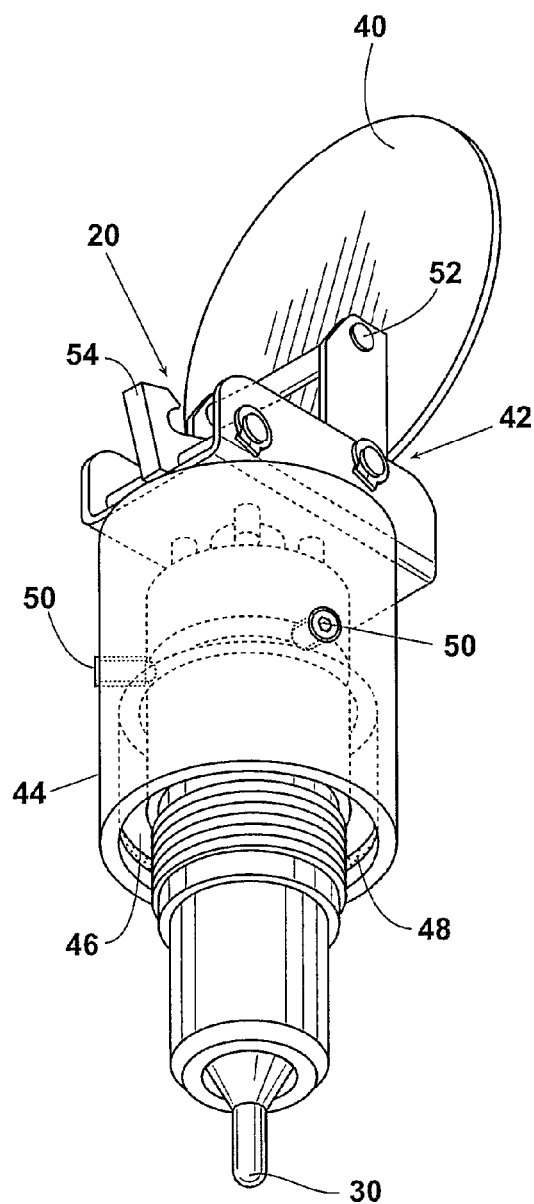
FIG. 8 is a perspective view showing the indicator assembly and the plug assembly.
Figure 5:
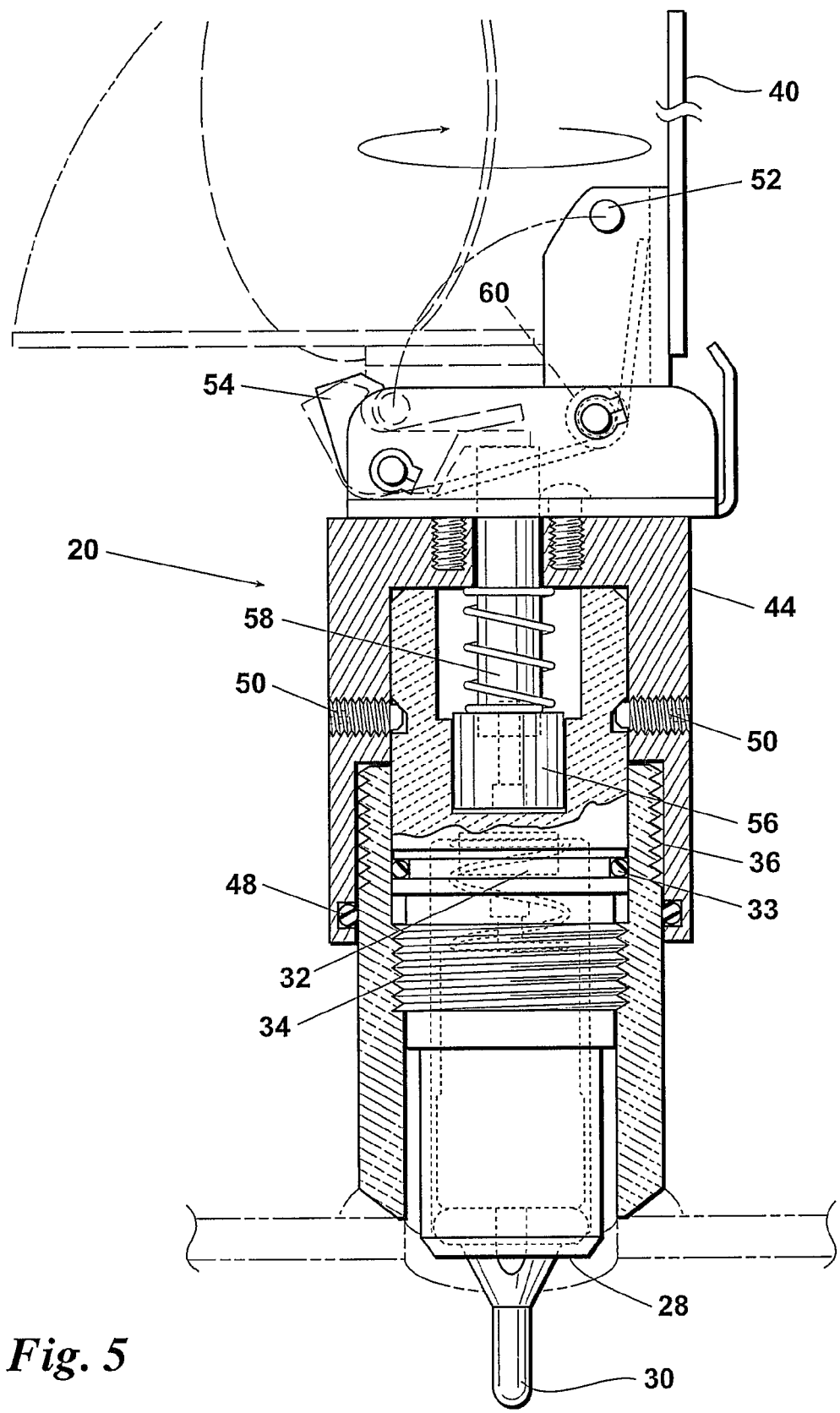
FIG. 5 is a sectional side view assembly of one embodiment of the present invention showing how the various parts fit together.
Figures 6, 7:
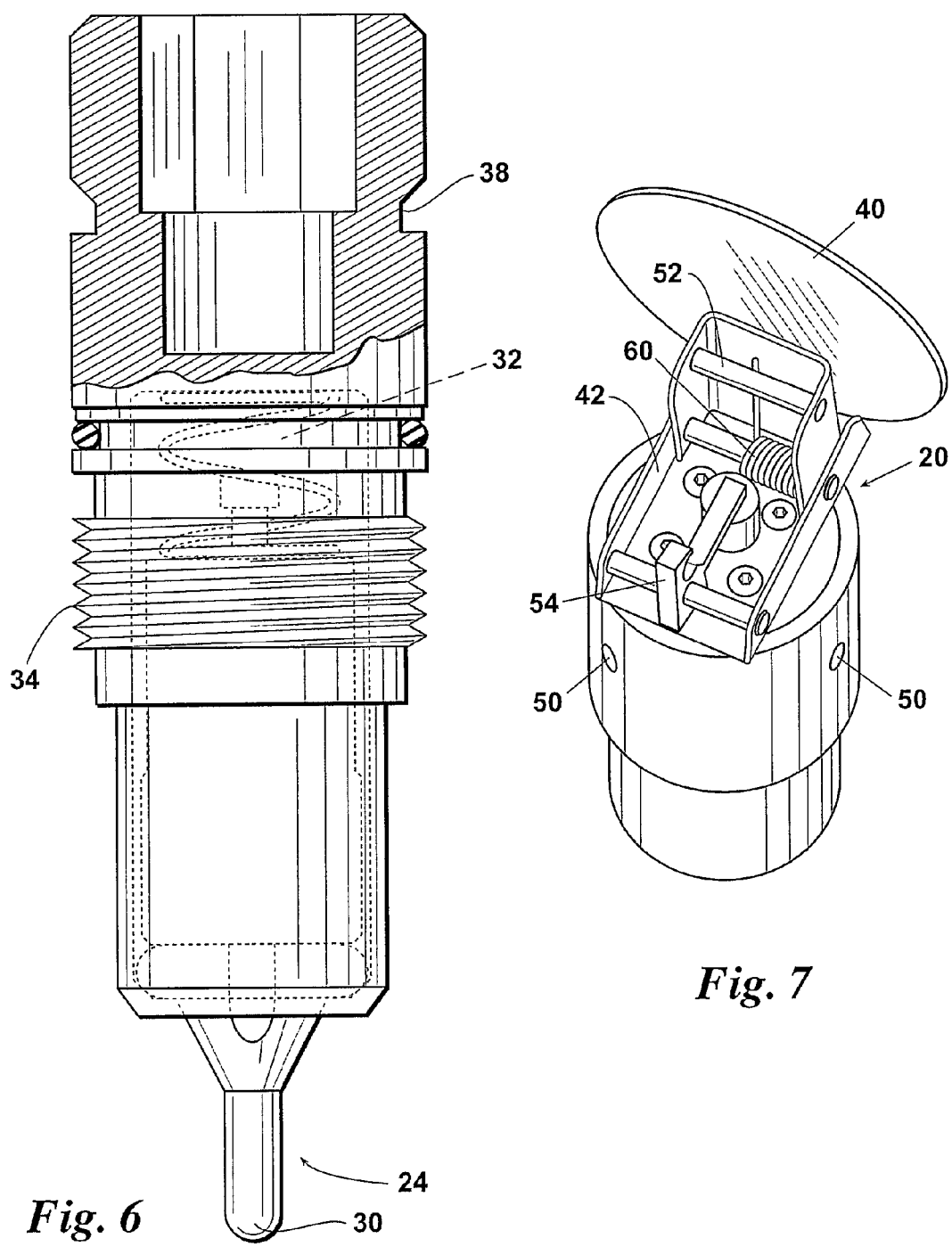
FIG. 6 is a side view assembly showing the detail of the plug assembly.
FIG. 7 is a top perspective view showing the release mechanism.
Figure 9:
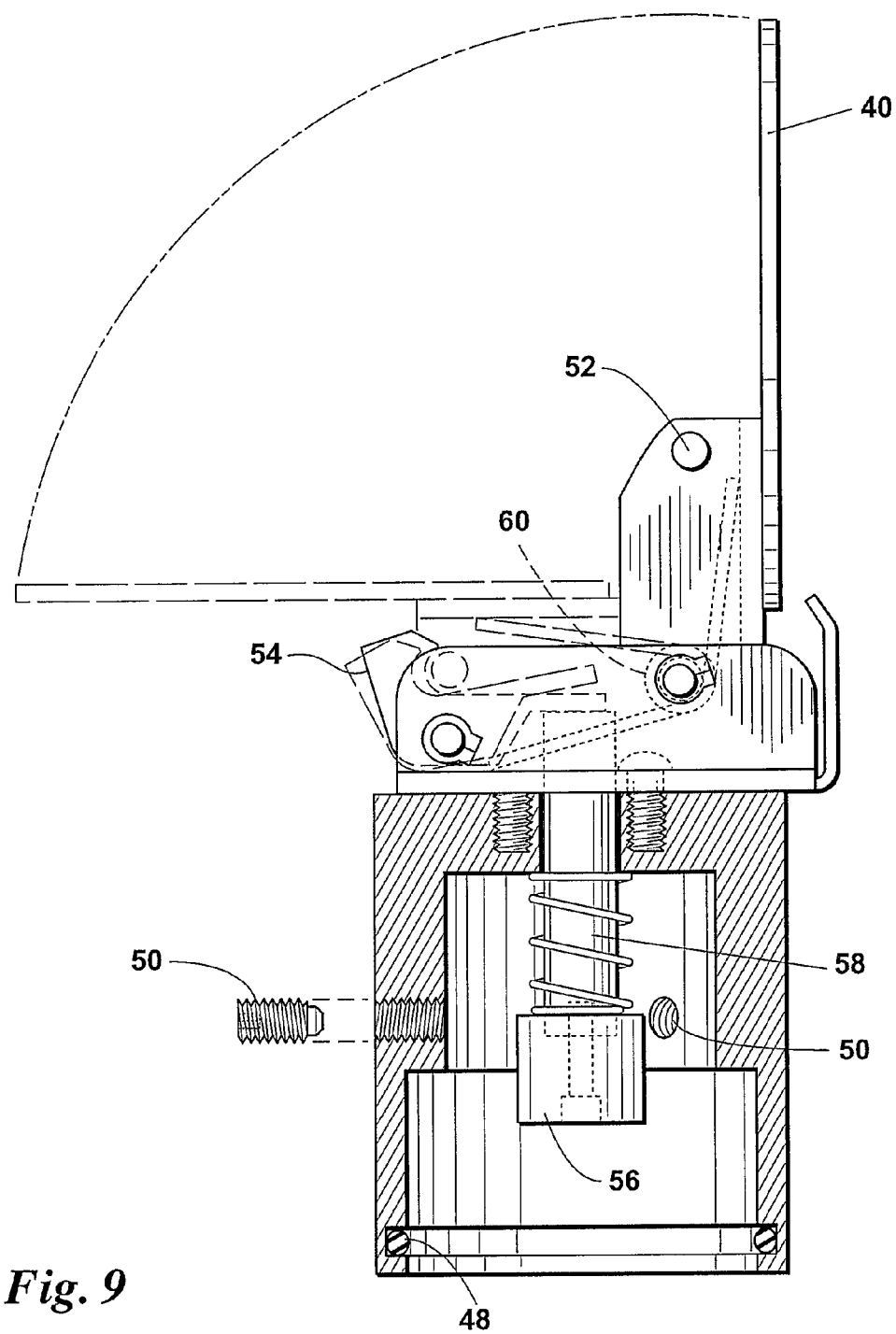
FIG. 9 is a sectional side view showing the internal detail of the indicator assembly.
Figure 11:
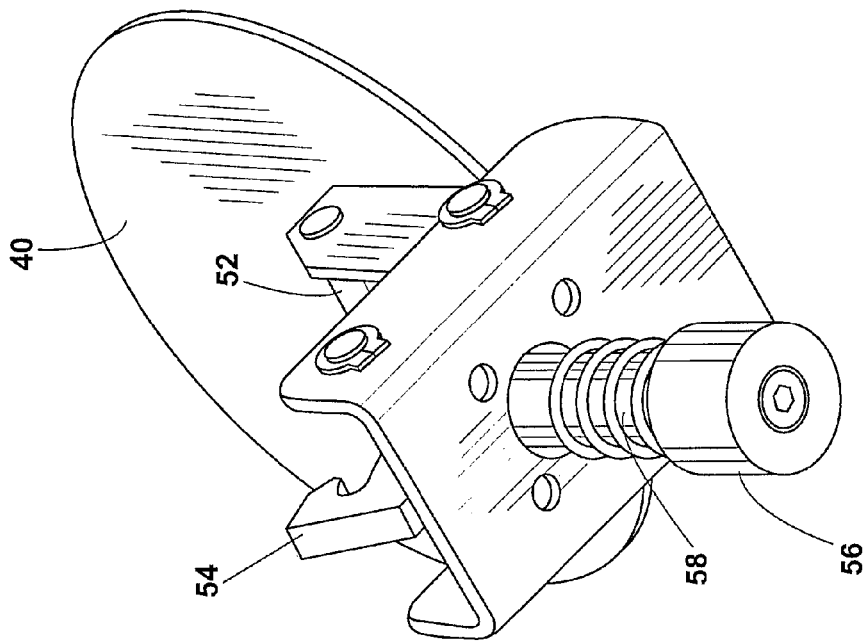
FIG. 11 is a bottom perspective view of the release mechanism of the present invention.
Figure 10:
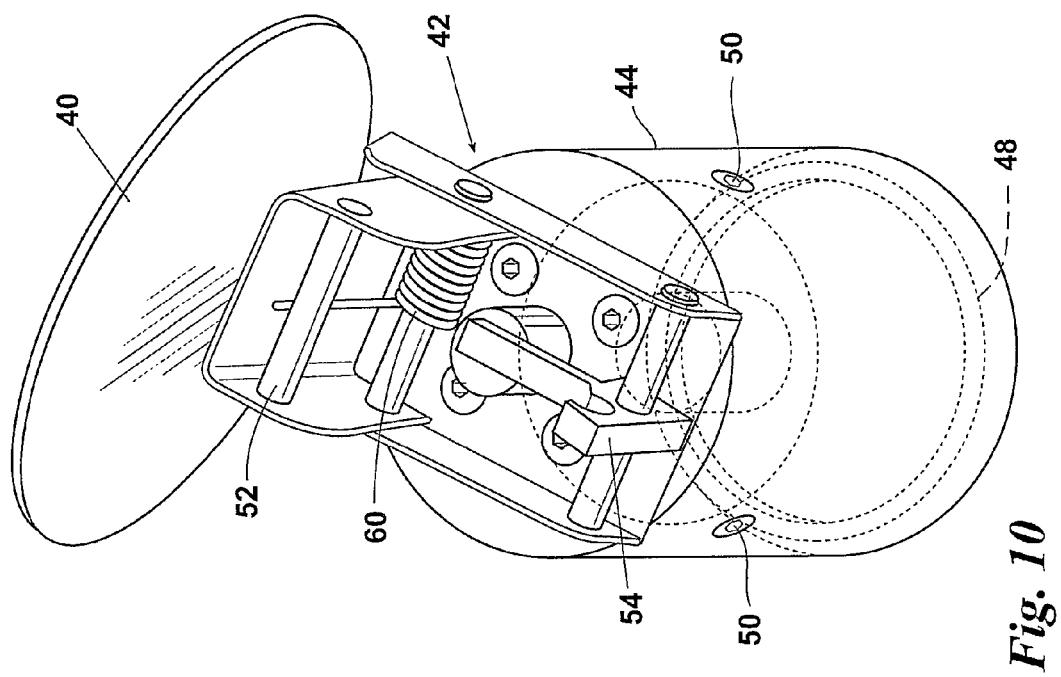
FIG. 10 is a perspective view of the indicator assembly showing the detail of the release mechanism.

FIGS. 1 through 4 show various embodiments of the improved pipeline pig signal 20, 120, 220 and 320 of the present invention. FIG. 5 is a side view of the embodiment shown in FIG. 1. The pipeline pig signal 20 has an indicator assembly 22, a plug assembly 24 and a nipple 26. When in use a small hole is made into the pipeline. The nipple 26 is secured to the pipeline by welding or other means well known in the art. Once secured to the pipeline the interior of the nipple 28 is in fluid communication with the interior of the pipeline. The plug assembly 24 is sized to fit into the interior 28 of nipple 26.

The plug assembly 24 has a cylindrical shaped body with a trigger 30. The first end the trigger 30 extends into the pipeline when the plug assembly 24 is placed in the nipple 26. The second end of the trigger 30 has a first magnet 32. The threads 34 located on the outside of the plug assembly 24 engage threads 36 located on the interior 28 of the nipple. The pressure inside the pipeline and inside the plug assembly are sealed off by an O-ring 33 with the plug head in place by the threads 34 of the plug assembly 24 engaging the threads 36 of the nipple 26. The plug assembly 24 also has a circumferential groove 38 in its outer diameter.

The indicator assembly 22 has a flag 40, a release mechanism 42 and a cylindrical body 44. The cylindrical body 44 has a hollow interior 46 which fits over the plug assembly 24 and nipple 26. A second O-ring 48 located on the interior 46 of the indicator assembly body 44 provides a seal in between the exterior of the nipple 26 and the interior 46 of the indicator assembly body 44. This prevents moisture and other debris from getting inside the interior 46 of the indicator assembly body 44 and causing corrosion or otherwise seizing up the parts. The indicator assembly 22 is secured to the plug assembly 24 by at least one set screw 50 passing through the indicator assembly body 44. The exact number of set screws 50 can vary, however in the preferred embodiment there are 3 or 4. These set screws 50 engage the groove 38 in the plug assembly 24 and hold the indicator assembly 22 in place relative to the plug assembly 24.

Once the nipple 26 and plug assembly 24 are mounted on the pipeline the indicator assembly 22 is placed over the nipple 26 and plug assembly 24. The indicator assembly 22 can be rotated such that the flag 40 faces any direction. This is accomplished by loosening one or more of the set screws 50, rotating the indicator assembly 22 to the desired orientation and securing the indicator assembly 22 in this orientation by tightening the set screws 50 to bear against the groove 38 in the plug assembly 24.

The embodiment of the present invention shown in the drawings has the flag 40 pivotally mounted to the indicator assembly 22. To prepare the signal for use the flag 40 is rotated such that the pin 52 engages the pivotally mounted release 54. As the pig moves along the pipeline and past the pipeline pig signal 20, the pig pushes against the trigger 30. This causes the trigger 30 to move longitudinally inside the plug assembly 24 and the first magnet 32 to move toward the second magnet 56. The first and second magnet 32 and 56 are polar opposites. Thus as the first magnet 32 moves closer to the second magnet 56 the second magnet moves upward away from the first magnet 32. As the second magnet 56 moves upward, this causes its mounting shaft 58 to also move upward and push against the release 54. This in turn causes the release 54 to rotate. As the release 54 rotates, the pin 52 is disengaged from the release 54. The torsion spring 60 then causes the flag 40 to pivot upward into its activated position.

While the figures show an activating mechanism with magnetic linkage to illustrate the operation of the present invention, it is possible to adapt the present invention to be used with other activating mechanisms and still fall within the scope of the claims.

Further, it would be possible to have the circumferential groove in the outer surface of the nipple 26. The set screws 50 would then be located to engage the groove on the nipple 26 to hold the indicator assembly 22 in the desired orientation.

The present invention can be mounted to a pipeline using various configurations. Turning to FIG. 2 the present invention can be flange mounted 120. The plug assembly 24 is secured to a flange 122 which is secured to a second flange 124. The second flange 124 being permanently affixed to a pipeline. This allows the trigger 30 to extend into the pipeline. The indicator assembly 22 and plug assembly 24 operate as previously described.

Turning now to FIG. 3 wherein the present invention 220 can be constructed such that the indicator assembly 222 is elongated. The device would still be constructed and operated as described as above, the difference being the shaft 58 for the second magnet 56 would be lengthened along with the body of the indicator assembly 220. This embodiment would be useful in situations where there are objects obstructing the view of the flag 40, such as un-mowed grass or brush.

The present invention 320 can also be used in conjunction with an integral valve. Here the plug assembly 24 and trigger

30 extend through the valve 322 and into a pipeline. The plug assembly 24 threadably engages a flange 324, in the same manner as other embodiments engage a nipple 26 as described above. The flange 324 mates up with the valve 322. The indicator and plug assemblies 22 and 24 function as described above in the other embodiments.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A pipeline pig indicator comprising:
   a nipple having an interior threaded surface and an exterior surface;
   a plug having threads located on an exterior surface, a groove located on an outer diameter, and a trigger, said plug being sized to threadedly engage said interior threaded surface of said nipple;
   an indicator assembly including a cylindrical body with a hollow interior sized to fit over said plug and nipple and having a planar flag pivotally movable between a horizontal position and a vertical position and spring biased towards said vertical position;
   a release mechanism capable of holding said flag in said horizontal position, said release mechanism being linked to said trigger; and
   said indicator assembly being mountable on said plug and nipple in selectable orientations and having at least one set screw passing through said cylindrical body and engaging said groove.

2. A pipeline pig indicator in accordance with claim 1 further comprising a first magnet linked to said trigger and a second magnet linked to said release mechanism, wherein said first magnet and said second magnet are polar opposites.

3. A pipeline pig indicator in accordance with claim 1 further comprising an o-ring located between said plug and said nipple.

4. A pipeline pig indicator in accordance with claim 1 further comprising an o-ring located between said nipple and said cylindrical body.

5. A pipeline pig indicator comprising:
   a flange having an interior threaded surface and an exterior surface;
   a plug having threads located on an exterior surface, a groove located on an outer diameter, and a trigger, said plug being sized to threadedly engage said interior threaded surface of said flange;
   an indicator assembly having a hollow interior sized to fit over said plug and said nipple and having a planar flag pivotally movable between a horizontal position and a vertical position and spring biased towards said vertical position; and
   a release mechanism capable of holding said flag in said horizontal position, said release mechanism being linked to said trigger and said indicator assembly being mountable on said plug and in selectable orientations relative to said flange and having at least one set screw passing through said cylindrical body and engaging said groove.

6. A pipeline pig indicator in accordance with claim 5 further comprising a first magnet linked to said trigger and a second magnet linked to said release mechanism, wherein said first magnet and said second magnet are polar opposites.

7. A pipeline pig indicator in accordance with claim 5, further comprising an o-ring located between said plug and said flange.

8. A pipeline pig indicator in accordance with claim 5 further comprising an o-ring located between said flange and said cylindrical body.

* * * * *